(12) United States Patent
Yamamoto et al.

(10) Patent No.: US 12,090,591 B2
(45) Date of Patent: Sep. 17, 2024

(54) DUST COLLECTION CUP AND POWER TOOL

(71) Applicant: MAKITA CORPORATION, Anjo (JP)

(72) Inventors: Mizuki Yamamoto, Anjo (JP); Yoshitaka Machida, Anjo (JP); Kiyonobu Yoshikane, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/167,554

(22) Filed: Feb. 10, 2023

(65) Prior Publication Data

US 2023/0321776 A1  Oct. 12, 2023

(30) Foreign Application Priority Data

Apr. 12, 2022 (JP) ................................ 2022-065827

(51) Int. Cl.
*B23Q 11/00* (2006.01)
*B25D 17/20* (2006.01)

(52) U.S. Cl.
CPC .......... *B23Q 11/0046* (2013.01); *B25D 17/20* (2013.01); *B23Q 11/0071* (2013.01); *B25D 2217/0065* (2013.01)

(58) Field of Classification Search
CPC .................. B23Q 11/0046; B23Q 11/0071
See application file for complete search history.

(56) References Cited

U.S. PATENT DOCUMENTS

| | | | | |
|---|---|---|---|---|
| 3,339,435 A * | 9/1967 | Heitz | .................... | B23B 31/001 408/67 |
| 5,160,230 A * | 11/1992 | Cuevas | .............. | B23Q 11/0071 408/72 R |
| 7,740,086 B2 * | 6/2010 | Bleicher | ................ | B25D 17/20 173/198 |
| 7,797,794 B2 * | 9/2010 | Bleicher | ................ | B08B 15/04 15/415.1 |
| 11,648,635 B2 * | 5/2023 | Peterson | ............ | B23Q 11/0046 408/67 |
| 2011/0008117 A1 * | 1/2011 | Kasuya | ................ | B25D 17/088 408/67 |
| 2017/0066095 A1 * | 3/2017 | Chen | ..................... | B23B 49/005 |
| 2017/0368655 A1 * | 12/2017 | Bergman | .............. | B23B 45/003 |
| 2019/0076973 A1 * | 3/2019 | Arthur | .................. | B25D 17/20 |
| 2020/0055154 A1 * | 2/2020 | Arthur | ............... | B23Q 11/0071 |
| 2020/0361047 A1 * | 11/2020 | Arthur | ............... | B23Q 11/0071 |

FOREIGN PATENT DOCUMENTS

JP           6008707 B2    10/2016

* cited by examiner

*Primary Examiner* — Eyamindae C Jallow
(74) *Attorney, Agent, or Firm* — Oliff PLC

(57) ABSTRACT

A dust collection cup allows a bit tip to be viewable without being detached or replaced. A dust collection cup is attachable to a front cylindrical portion of a hammer drill. The dust collection cup in an attached state allows a bit attached to the front cylindrical portion to extend through the dust collection cup. The dust collection cup includes an attachment attachable to the front cylindrical portion, and a body connectable to the attachment. The body includes an extendable unit including at least a portion in an axial direction retaining a predetermined length.

20 Claims, 7 Drawing Sheets

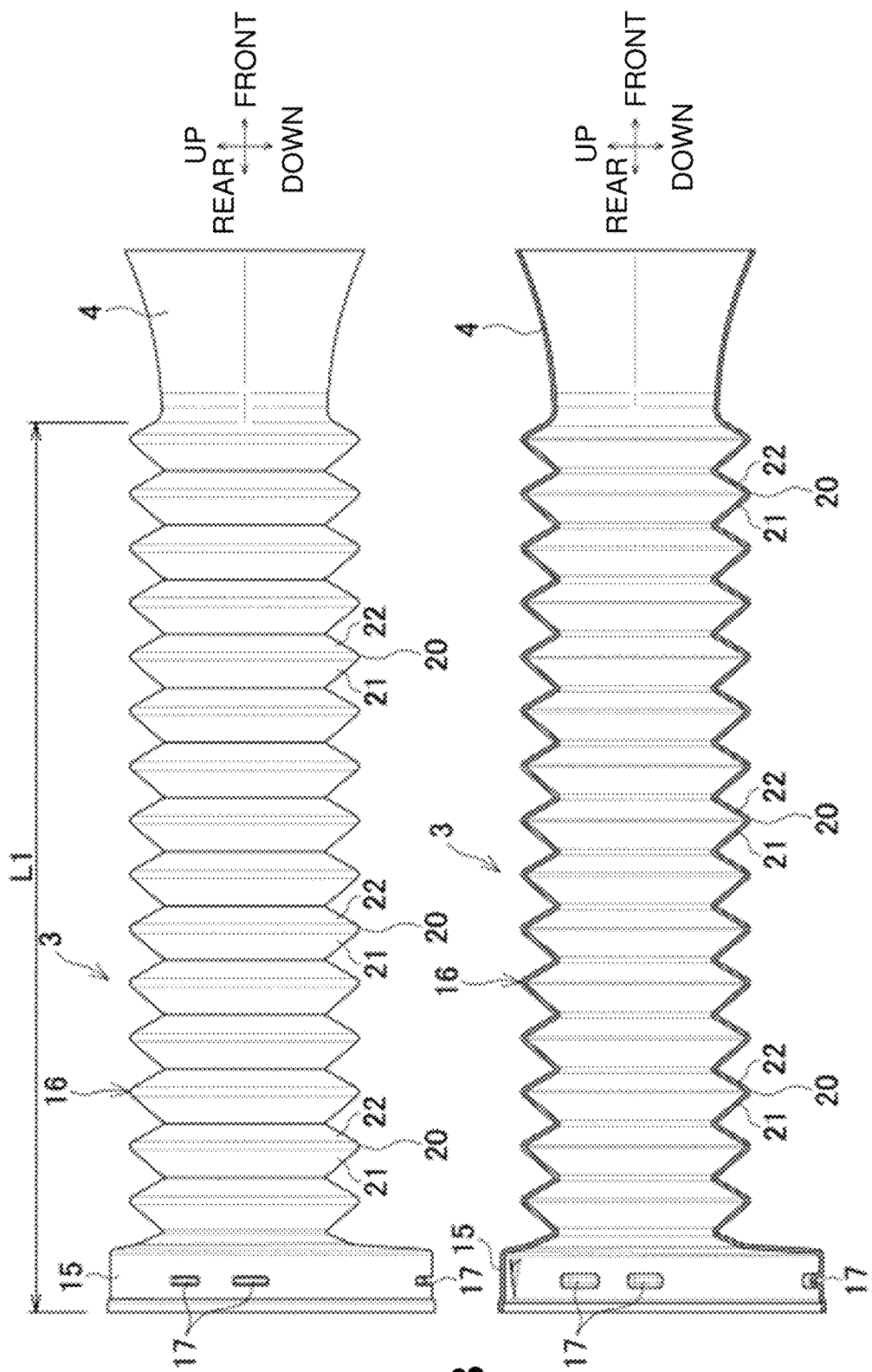

DUST COLLECTION CUP AND POWER TOOL

CROSS-REFERENCE TO RELATED APPLICATIONS

This application claims the benefit of priority to Japanese Patent Application No. 2022-065827, filed on Apr. 12, 2022, the entire contents of which are hereby incorporated by reference.

BACKGROUND

1. Technical Field

The present disclosure relates to a dust collection cup attachable to a power tool such as a hammer drill for dust collection, and to a power tool with the dust collection cup.

2. Description of the Background

For a power tool such as a hammer drill used for an operation such as drilling with a rotating bit attached to its front end portion, a cylindrical dust collection cup is attached to the front end portion of the power tool to prevent scattering of dust from a workpiece. A dust collection cup described in, for example, Japanese Patent No. 6008707, includes an attachment attached to the front end portion of a power tool, and a bellows-like body attached to the front of the attachment to cover a bit.

BRIEF SUMMARY

For a chipping operation using a hammer drill to which a bit such as a bull point is attached, the bit tip is to be viewed during the chipping operation. However, a known dust collection cup includes a body extended when the hammer drill is not pressed against a workpiece. The extended body can cover the bit tip. For the bit tip to be viewable, the dust collection cup is to be either detached or replaced with a dust collection cup having a shorter body for chipping.

One or more aspects of the present disclosure are directed to a dust collection cup and a power tool that allow a bit tip to be viewable without the dust collection cup being detached or replaced.

A first aspect of the present disclosure provides a dust collection cup attachable to a front end portion of a power tool, the dust collection cup in an attached state allowing a bit attached to the front end portion to extend through the dust collection cup, the dust collection cup including:
  an attachment attachable to the front end portion; and
  a body connectable to the attachment, the body including
    an extendable unit including at least a portion in an axial direction retaining a predetermined length.

A second aspect of the present disclosure provides a power tool, including:
  a front end portion to which a bit is attachable; and
  the above dust collection cup being attachable to the front end portion.

The structure according to each of the above aspects of the present disclosure allows the bit tip to be viewable without the dust collection cup being detached or replaced.

BRIEF DESCRIPTION OF DRAWINGS

FIG. 7A is a side view of the body with a maximum length.

FIG. 7B is a longitudinal central sectional view of the body with the maximum length.

DETAILED DESCRIPTION

Embodiments of the present disclosure will now be described with reference to the drawings.

Figure 1:
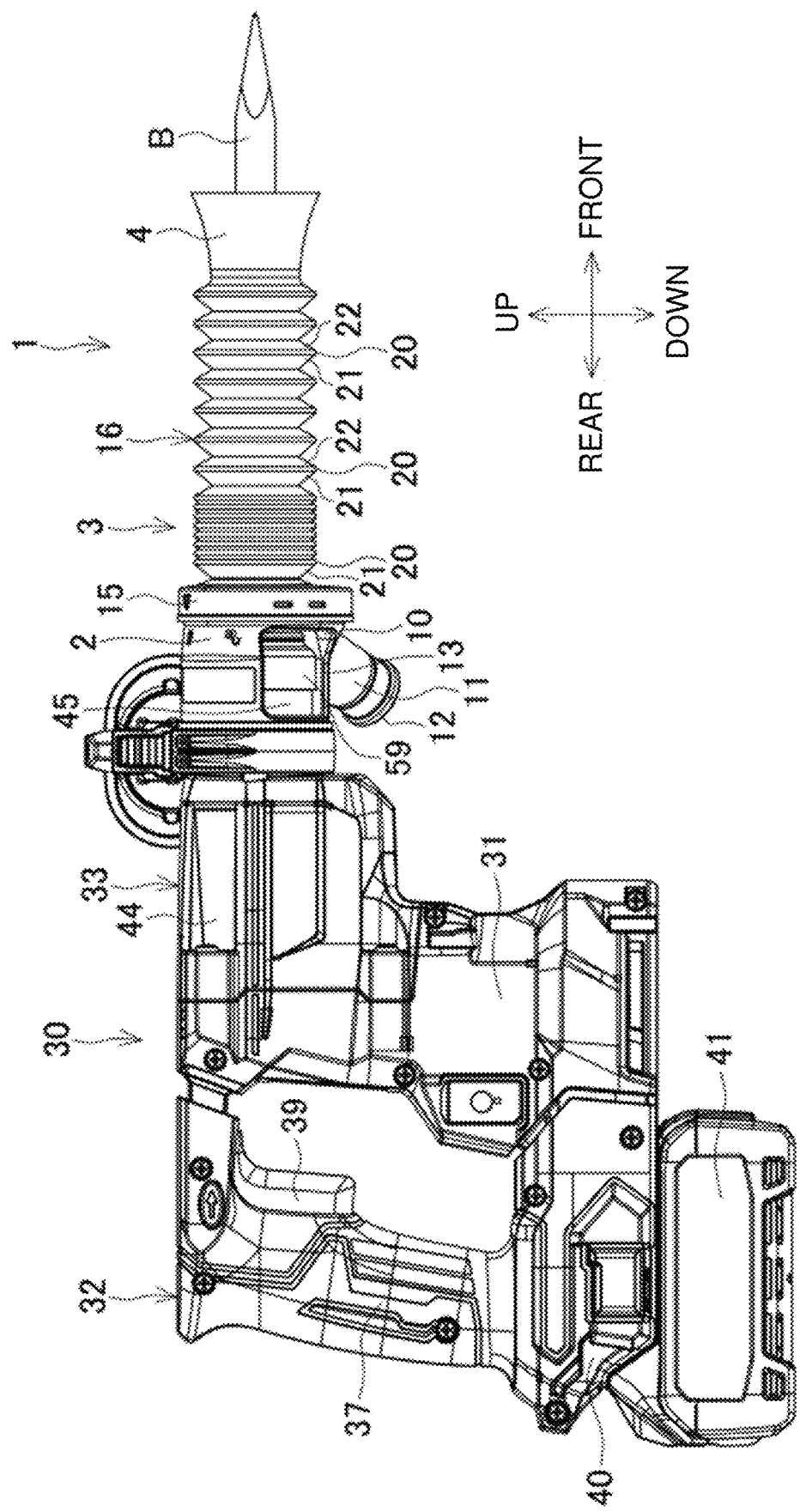
FIG. 1 is a side view of a hammer drill with a dust collection cup.
Figure 2:
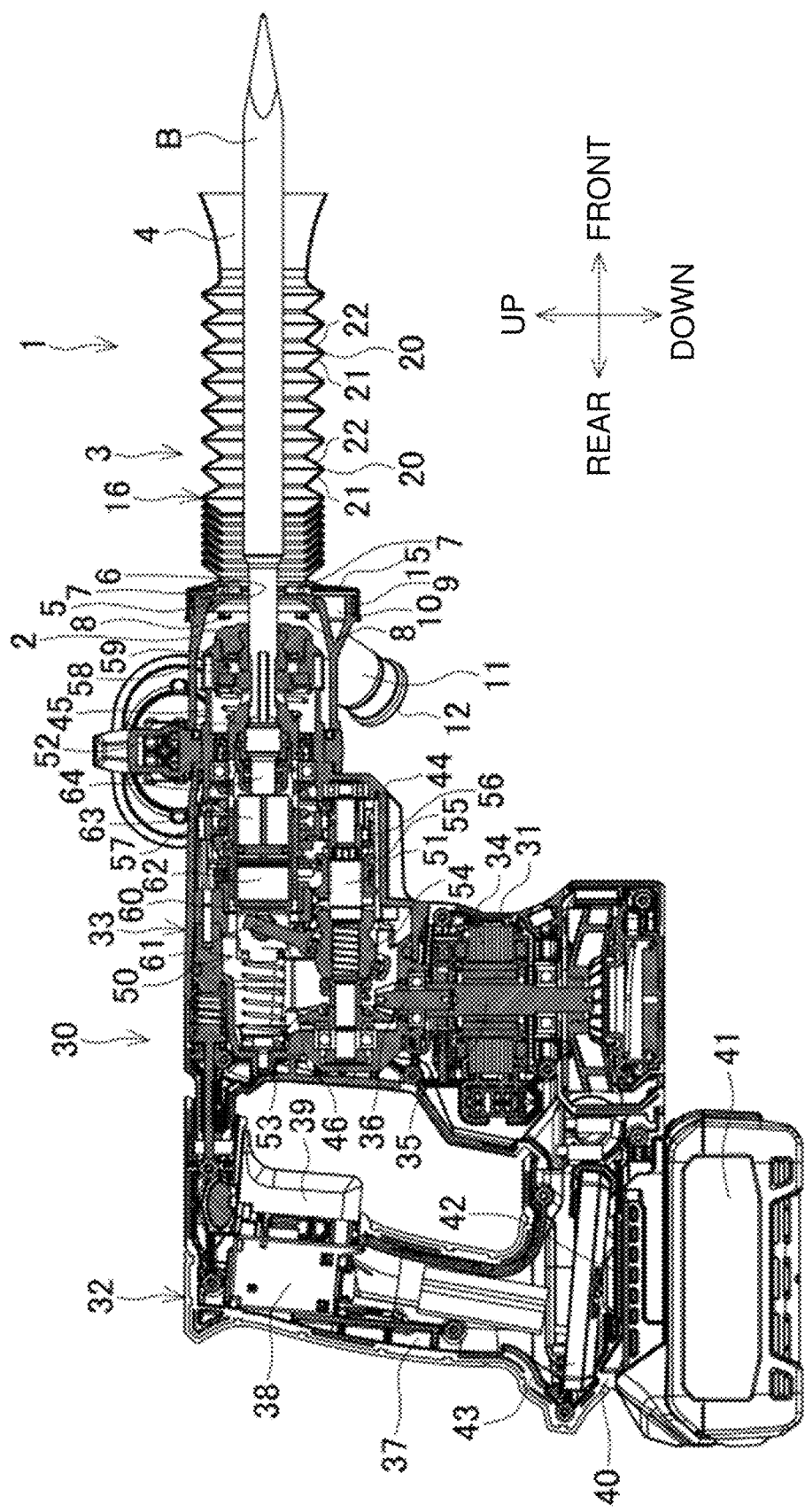
FIG. 2 is a longitudinal central sectional view of the hammer drill with the dust collection cup.
Figure 3:
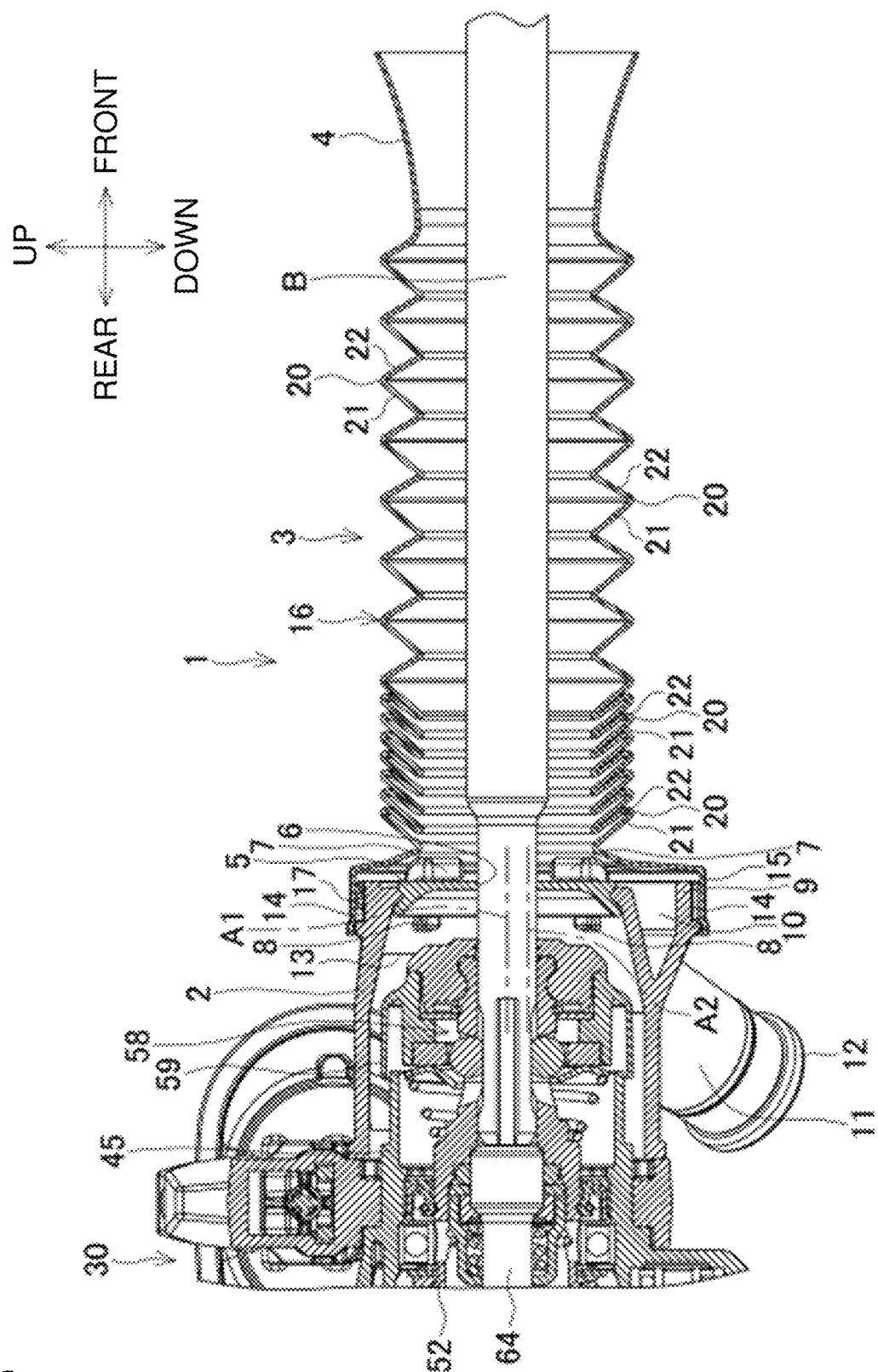
FIG. 3 is an enlarged view of the dust collection cup in FIG. 2.

FIG. 1 is a side view of a dust collection cup and a hammer drill as an example of a power tool according to an embodiment. FIG. 2 is a central longitudinal sectional view of the dust collection cup and the hammer drill in FIG. 1. FIG. 3 is an enlarged view of the dust collection cup in FIG. 2.

A dust collection cup 1 includes an attachment 2, a body 3, and a suction unit 4 in the stated order from the rear.

The attachment 2 is a resin cylinder. The attachment 2 is detachably attached to a front cylindrical portion 45 of a hammer drill 30 from the front with, for example, bayonet connection. A seal plate 5 is located at the front end of the attachment 2. The seal plate 5 has a through-hole 6 at the center. A bit B extends through the through-hole 6.

The attachment 2 includes, at its front end, four front receivers 7 at equal intervals in the circumferential direction. The front receivers 7 are in contact with the front surface of the seal plate 5. The attachment 2 includes, on its inner circumference and behind the front receivers 7, four rear receivers 8 at equal intervals in the circumferential direction. The rear receivers 8 are in contact with the rear end of the seal plate 5. The seal plate 5 is thus positioned at the front end of the attachment 2 with the front receivers 7 and the rear receivers 8. The seal plate covers the front end of the attachment 2 except the through-hole 6.

The attachment 2 is integral with, in its front portion, a holder 9 for the body 3. The holder 9 is a circular ring having a larger diameter than the front end of the attachment 2. The holder 9 has an axis A2 decentered downward from an axis A1 of the attachment 2 (the axis of the bit B) in the radial direction of the attachment 2 (the radial direction of the bit B).

A sealing portion 10 is located behind the holder 9. The sealing portion 10 includes a cylindrical portion 11. The cylindrical portion 11 protrudes obliquely rearward. A stopper 12 removably covers the distal end of the cylindrical portion 11. The attachment 2 includes a pair of windows 13 on its circumferential surface except the sealing portion 10.

The holder 9 has three engaging recesses 14 on its outer circumferential surface. Each engaging recess 14 is open at the front end and extends in the circumferential direction.

The body 3 is a resin cylinder that is thinner than the attachment 2. The body 3 is separate from the attachment 2 and is attachable to and detachable from the attachment 2.

Figure 4:
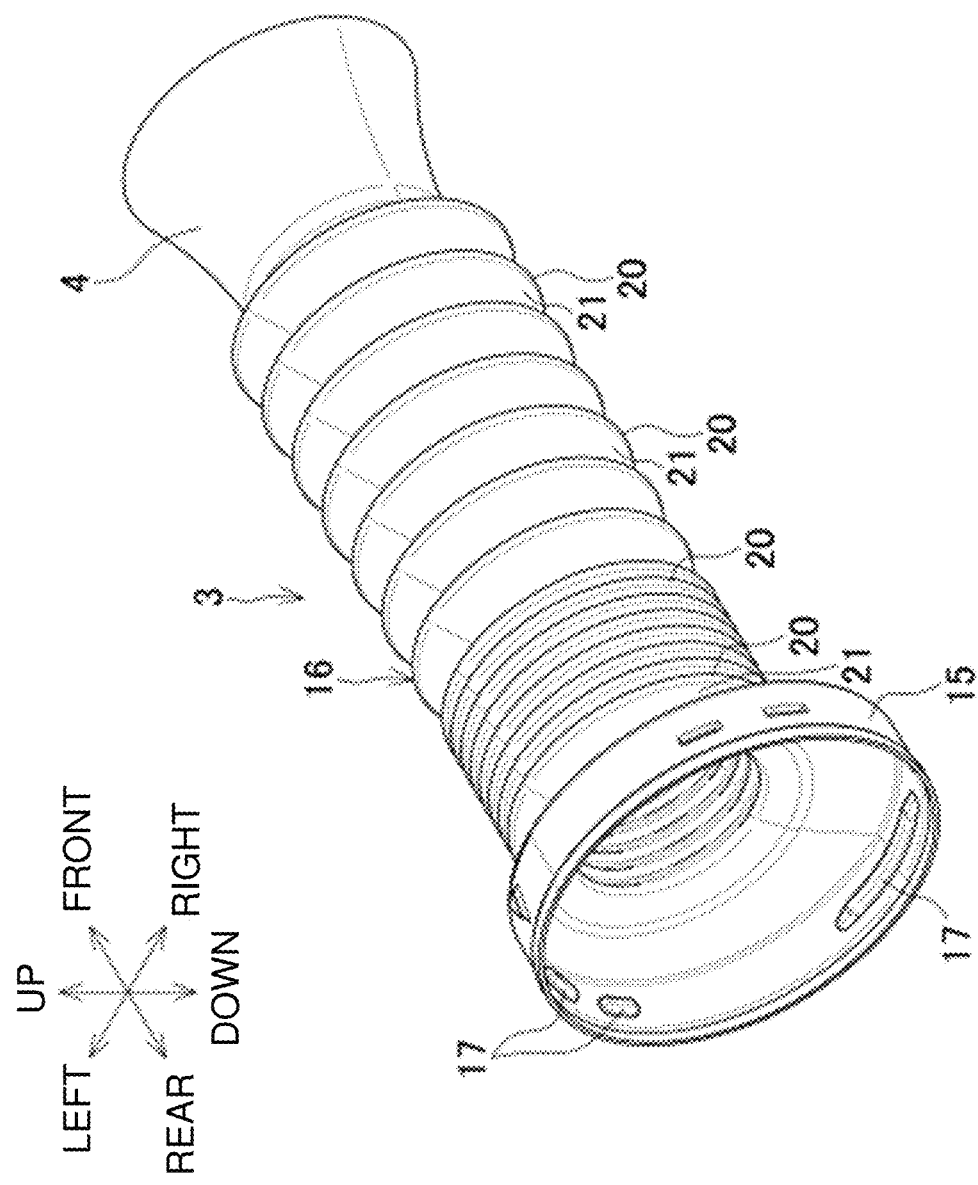
FIG. 4 is a perspective view of a body.
Figure 5:
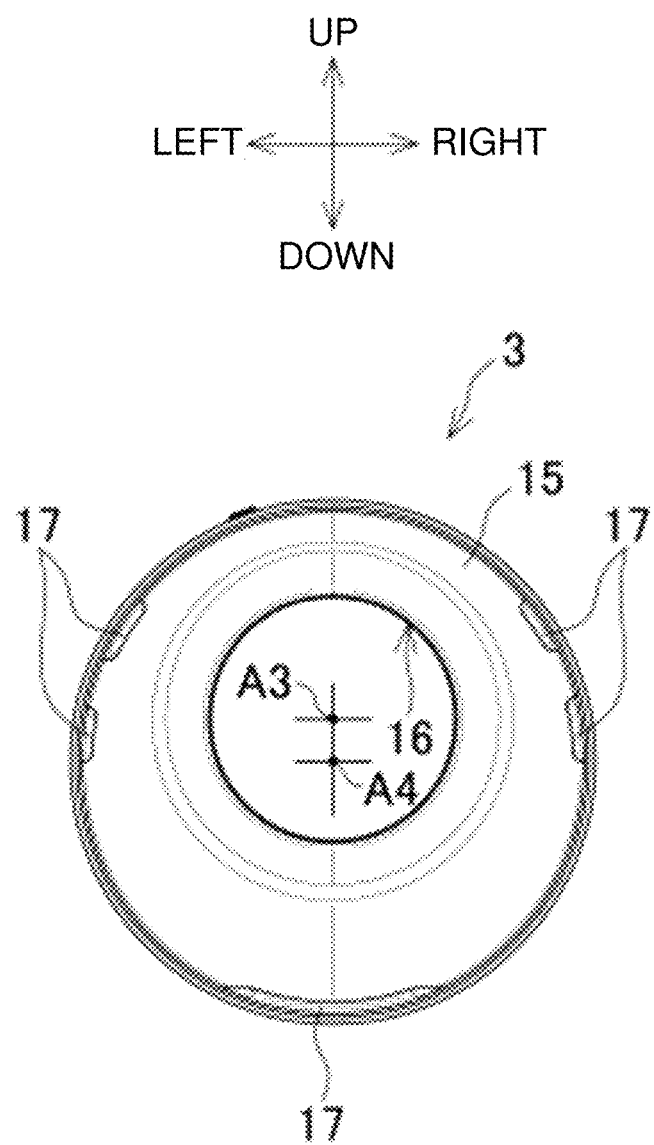
FIG. 5 is a rear view of the body.

The body 3 includes a cap 15 and an extendable unit 16. As also shown in FIG. 4, the rear end of the extendable unit 16 is joined to the front face of the cap 15. The cap 15 is open rearward. As shown in FIG. 5, the cap 15 has an axis A4 decentered from an axis A3 of the extendable unit 16 in the radial direction of the bit B. The axis A4 is decentered from the axis A3 by the same amount as the amount by which the axis A2 of the holder 9 is decentered from the axis A1 of the attachment 2.

The cap 15 has an inner diameter slightly larger than the outer diameter of the holder 9 in the attachment 2. The holder 9 is covered by the cap 15 at the front. Ridges 17 are raised from the inner circumferential surface of the cap 15 toward the center. Each ridge 17 extends in the circumferential direction of the cap 15. Each ridge 17 is placed from the front end of the corresponding engaging recess 14 on the holder 9 in the attachment 2 to be bayonet-connected to the holder 9.

The extendable unit 16 is a bellows with multiple crests 20 continuous in the axial direction. Each crest 20 includes a rear half 21 and a front half 22. The rear half 21 flares from the rear end toward the apex. The front half 22 has a diameter decreasing from the apex toward the front end. The front half 22 in the present embodiment has a smaller dimension than the rear half 21 in the front-rear direction. The rear half 21 and the front half 22 are thus asymmetric to each other in the front-rear direction.

In response to a compressive force applied to each crest 20 in an extended state in the axial direction, the front half 22 deforms rearward in a curved manner and overlaps the rear half 21. The crest 20 is retained in its folded state without elastically returning to its original extended state.

Figure 6A:
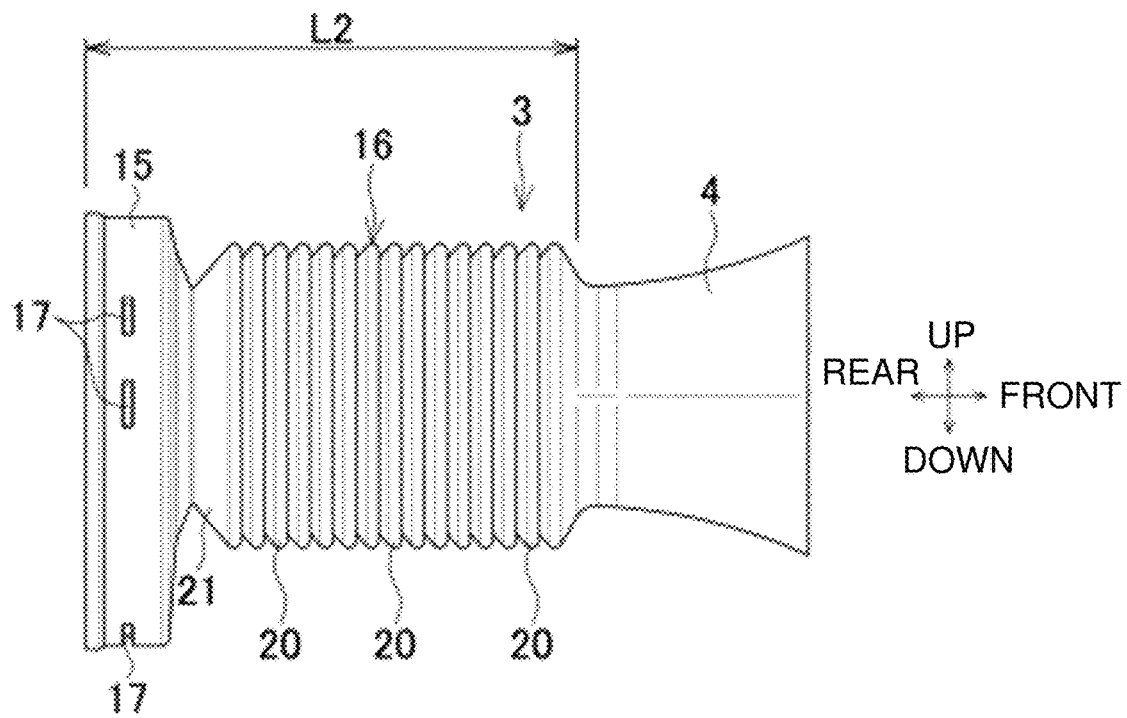
FIG. 6A is a side view of the body with a minimum length.
Figure 6B:
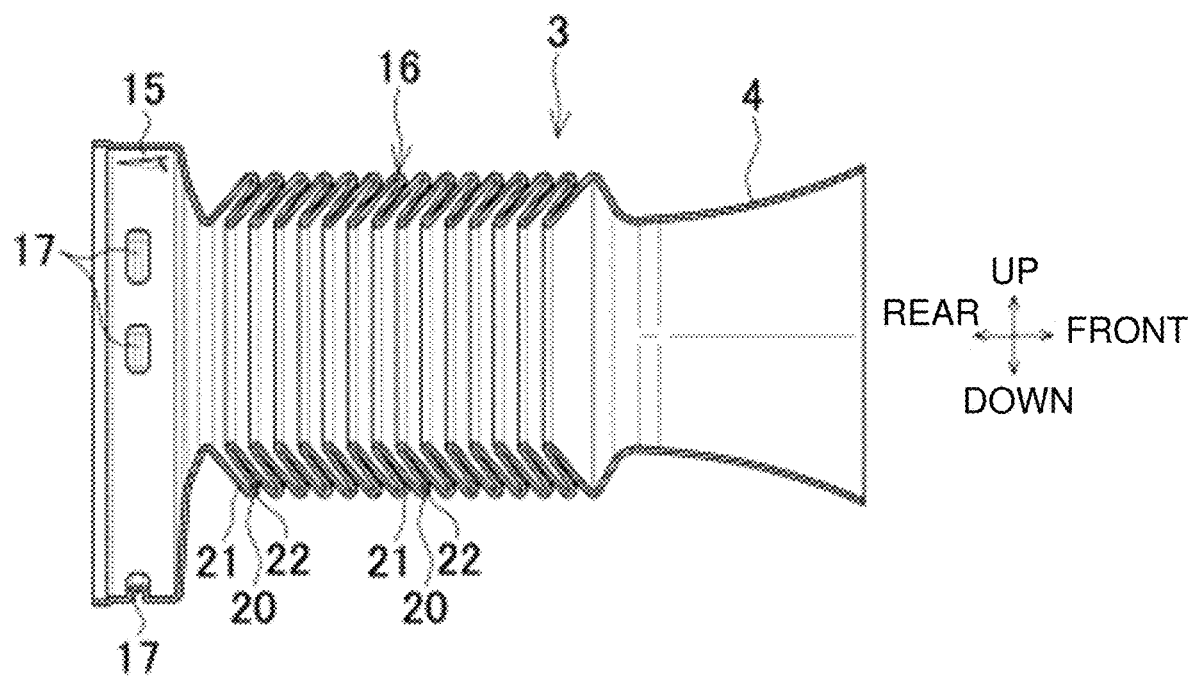
FIG. 6B is a longitudinal central sectional view of the body with the minimum length.

When multiple crests 20 adjacent to one another in the axial direction are in the folded state, the extendable unit 16 remains shortened in the axial direction. FIGS. 3 and 4 show multiple crests 20 in a rear portion of the extendable unit 16 in the folded state. FIGS. 6A and 6B show all the crests 20 in the extendable unit 16 in the folded state. FIGS. 7A and 7B show all the crests 20 in the extendable unit 16 in the extended state.

The extendable unit 16 is selectable between the extended state and the folded state of the crests 20. This allows the extendable unit 16 to be retained at any length between a minimum length shown in FIGS. 6A and 6B and a maximum length shown in FIGS. 7A and 7B. Any number of crests 20 to be folded may be at any positions.

In the present embodiment, the body 3 with the extendable unit 16 having the minimum length in FIGS. 6A and 6B has a length L2 that is half or less than half a length L1 of the body 3 with the extendable unit 16 having the maximum length in FIGS. 7A and 7B in the axial direction.

The suction unit 4 is integrally connected to the front end of the extendable unit 16. The suction unit 4 flares frontward and has a curved and sloping surface.

The cap 15 in the body 3 covers the holder 9 in the attachment 2 to be bayonet-connected. The extendable unit 16 decentered from the cap 15 rotates about the axis A4 of the cap 15. The axis A3 of the extendable unit 16 reaches a position coaxial with the axis A1 of the attachment 2. An opening at the rear end of the extendable unit 16 in contact with the front receivers 7 restricts backward movement of the extendable unit 16.

With the bayonet connection, the front receivers 7 define a clearance in the front-rear direction between the opening at the rear of the extendable unit 16 and the front surface of the seal plate 5. This clearance connects with an inner space of the holder 9 and the sealing portion through spaces between the multiple front receivers 7, and further with the cylindrical portion 11.

As shown in FIGS. 1 and 2, the hammer drill 30 includes a main housing 31, a rear housing 32, and a front housing 33.

The main housing 31 accommodates a motor 34 in its lower portion. The main housing 31 is connected to the front housing 33 in its upper portion. The motor 34 with a rotational shaft 35 extending vertically is accommodated in the main housing 31. The rotational shaft 35 receives a pinion 36 facing upward at its upper end.

The rear housing 32 includes a grip 37 extending vertically. The rear housing 32 is connected to the main housing 31 in a loop. The grip 37 includes a switch 38 in its upper portion. A trigger 39 protrudes from a front portion of the switch 38. The grip 37 includes a battery mount 40 in its lower portion. A battery pack 41 is slidable onto the battery mount 40 from the rear. The battery mount 40 holds a terminal block 42. The terminal block 42 is electrically connectable to the battery pack 41. The battery mount 40 also accommodates a controller 43 above the terminal block 42.

The front housing 33 is cylindrical and includes a rear cylindrical portion 44 and a front cylindrical portion 45. The rear cylindrical portion 44 is fastened to an upper portion of the main housing 31 with screws from the front. The front cylindrical portion 45 is decentered upward from the rear cylindrical portion 44 and protrudes frontward. A switching knob (not shown) for switching the operation mode is located on the left side surface of the rear cylindrical portion 44.

An inner housing 46 is located in the upper portion of the main housing 31. The inner housing 46 is assembled to the rear cylindrical portion 44. A rotation-striking assembly 50 is located between the front housing 33 and the inner housing 46.

The rotation-striking assembly 50 includes a countershaft 51 and a tool holder 52. The countershaft 51 and the tool holder 52 extend in the front-rear direction. The countershaft 51 is rotatably supported in lower portions of the front housing 33 and the inner housing 46. The countershaft 51 receives a first gear 53, a boss sleeve 54, a clutch 55, and a second gear 56 in the stated order from the rear. The pinion 36 on the rotational shaft 35 extends into the inner housing 46 from below and meshes with the first gear 53.

The tool holder 52 is cylindrical and supported, above the countershaft 51, to be rotatable coaxially with the front cylindrical portion 45. A third gear 57 is located at the middle of the tool holder 52. The third gear 57 meshes with the second gear 56 on the countershaft 51. The tool holder 52 includes a chuck 58 at the front end. The chuck 58 protrudes frontward from the front cylindrical portion 45. The bit B is connected to the chuck 58. An operation sleeve 59 is located in front of the front cylindrical portion 45. The operation sleeve 59 is operable to attach or detach the bit B with the chuck 58.

A piston cylinder 60 is loosely received in a rear portion of the tool holder 52 to be movable back and forth. The piston cylinder 60 receives an arm 61 connected to its rear end. The arm 61 is connected to the boss sleeve 54 with a swash bearing with the axis tilted. The arm 61 is swingable back and forth. The piston cylinder 60 accommodates a striker 63 in a manner movable back and forth across an air chamber 62. An impact bolt 64 is located in the tool holder 52 in front of the piston cylinder 60.

In response to the trigger 39 being depressed, the switch 38 is turned on to cause the controller 43 to drive the motor 34. The rotational shaft 35 rotates with the pinion 36, causing the countershaft 51 to rotate with the first gear 53. The switching knob on the side surface of the rear cylindrical portion 44 is operable to slide the clutch 55. The clutch 55 can be selectively at a frontward position in a drill mode, a rearward position in a hammer mode, or a middle position in a hammer drill mode.

The clutch 55 at the frontward position meshes with the second gear 56 alone to enter the drill mode. The clutch 55 at the rearward position meshes with the boss sleeve 54 alone to enter the hammer mode. The clutch 55 at the middle position meshes with both the second gear 56 and the boss sleeve 54 at the same time to enter the hammer drill mode.

In the drill mode, the tool holder 52 rotates with the third gear 57 to rotate the bit B. In the hammer mode, the arm 61 swings to cause the piston cylinder 60 to reciprocate. The striker 63 thus reciprocates across the air chamber 62. The striker 63 then strikes the bit B with the impact bolt 64. In the hammer drill mode, the tool holder 52 rotates, and the impact bolt 64 performs striking at the same time.

To perform a chipping operation with the hammer drill 30 with the dust collection cup 1 according to the present embodiment, the attachment 2 is placed over the front cylindrical portion 45 from the front to be bayonet-connected.

In this state, the rear end of the bit B for chipping (a bull point in FIGS. 1 and 2) is placed into the dust collection cup 1 through the front end to allow the bit B to extend through the through-hole 6 in the seal plate 5. The bit B is thus attached to the chuck 58. The operation sleeve 59 is operable through the windows 13 in the attachment 2. The attached bit B is coaxially surrounded by the body 3 and the suction unit 4. A space around the bit B in the body 3 connects with a front space located in front of the seal plate 5 and surrounded by the front receivers 7. The front space connects with the cylindrical portion 11 through the spaces between the front receivers 7 and through the holder 9 and the sealing portion 10.

As shown in FIGS. 1 and 2, the extendable unit 16 in the body 3 includes any number of crests 20 (multiple crests 20 in the rear portion in FIGS. 1 and 2) in a folded state. The extendable unit 16 contracts in the axial direction to cause the suction unit 4 to retract and cause the tip of the bit B to protrude frontward from the suction unit 4. The exposed tip of the bit B can thus be easily placed at a chipping position.

In this state, the hammer mode is selected and the hammer drill 30 is activated to cause striking of the bit B to perform the chipping operation. The tip of the bit B remains exposed, allowing the operator to work while viewing the tip of the bit B.

For a drilling operation, a bit for drilling is attached to the chuck 58, and the extendable unit 16 in the body 3 is extended. The suction unit 4 is then pressed against a workpiece to place the bit tip at a drilling position. In this state, the hammer drill 30 activated in the drill mode or in the hammer drill mode rotates the bit to drill a hole in the workpiece. As the bit drills the hole, the extendable unit 16 contracts, thus allowing the hammer drill 30 and the attachment 2 to move forward. The rear end of the extendable unit 16 is in contact with the four front receivers 7 in the attachment 2. A repulsive force from the compression of the extendable unit 16 is uniformly applied to the four front receivers 7. The extendable unit 16 is thus less likely to be tilted relative to the bit and is compressed linearly in the axial direction.

Dust produced from drilling the workpiece is stored in the body 3. Without an external dust collection device, the cylindrical portion 11 covered with the stopper 12 prevents the dust stored in the body 3 from leaking from the cylindrical portion 11. Once the operation is complete, the stopper 12 is removed, and the dust is discharged through the cylindrical portion 11 or through the front end of the suction unit 4.

When an external dust collection device is used, a flexible hose in the external dust collection device, in place of the stopper 12, is connected to the cylindrical portion 11. When the dust collection device is activated, the resulting dust flows with air from the body 3 and through the holder 9, the sealing portion 10, and the cylindrical portion 11 in the attachment 2. The dust is then drawn by the dust collection device through the flexible hose. Thus, dust is discharged effectively while the drilling is being performed.

The dust collection cup 1 according to the present embodiment is attachable to the front cylindrical portion 45 (a front end portion) of the hammer drill 30. The dust collection cup 1 is cylindrical. The dust collection cup 1 in an attached state allows the bit B attached to the front cylindrical portion 45 to extend through the dust collection cup 1.

The dust collection cup 1 includes the body 3 (a portion of the dust collection cup 1 in the axial direction). A substantially entire portion of the body 3 defines the extendable unit 16.

The dust collection cup 1 and the hammer drill 30 with the dust collection cup 1 attached to the front cylindrical portion 45 according to the present embodiment allow the body 3 to have a length in the axial direction adjustable for the type of the bit B and for the operation to be performed. The structure thus allows the bit tip to be viewable without the dust collection cup 1 being detached or replaced in an operation such as chipping.

The substantially entire portion herein refers to the body defining the extendable unit across its full length in the axial direction, and also the body defining the extendable unit except a joint between the body and the attachment or except a joint between the body and the suction unit.

The dust collection cup 1 includes the attachment 2 attachable to the front cylindrical portion 45, the body 3 connectable to the attachment 2, and the suction unit 4 connected to the body 3 and open frontward. The substantially entire portion of the body 3 defines the extendable unit 16.

The body 3 is thus operable to easily adjust the length of the body 3 in the axial direction.

Specifically, the substantially entire portion of the body 3 except the cap 15 defines the extendable unit 16. The body 3 thus has a shorter minimum length in the axial direction, allowing its length to be adjustable in the axial direction.

The body 3 is attachable to and detachable from the attachment 2.

The body 3 is thus replaceable with another body 3 with a different length or another body 3 including an extendable unit 16 or a suction unit 4 with different structures.

The body 3 including the extendable unit 16 with the minimum length has the length L2 half or less than half the length L1 of the body 3 including the extendable unit 16 with the maximum length in the axial direction.

The body 3 has a length largely adjustable in the axial direction, thus improving usability. The extendable unit 16 is a bellows including the multiple crests 20 continuous in the axial direction.

The extendable unit 16 is thus produced easily.

Each crest 20 is retainable in a folded state in response to a compressive force applied in the axial direction. In the folded state, the front half 22 overlaps the rear half 21.

The selected length in the axial direction is thus retained easily.

The cylindrical portion 11 (a connection port) is located rearward from the extendable unit 16. The cylindrical portion 11 is connectable to a flexible hose (an external dust collection hose).

The collected dust or other matter can be efficiently collected in, for example, a dust collection device.

Modifications of the present disclosure will now be described.

The number of crests in the body is not limited to the example in the embodiment. More or fewer crests than in the embodiment may be included as appropriate. The bellows-like area defined by the crests is not limited to the substantially entire portion of the body except the cap as in the present embodiment. For example, the bellows-like area may be partly located at the front, the middle, or the rear of the body. The bellows-like area may be separate in the axial direction to be a front portion and a rear portion.

In the present embodiment, each crest is asymmetric in the front-rear direction with the front half having a smaller dimension than the rear half in the front-rear direction. In some embodiments, each crest may be asymmetric in the front-rear direction with the front half having a larger dimension than the rear half in the front-rear direction.

The crest may not be asymmetric in the front-rear direction when the crest can be retained in a folded state when compressed.

The extendable unit may be telescopic rather than being a bellows. The telescopic unit also has its length adjustable in the axial direction.

The body may be integral with the attachment, rather than being attachable to and detachable from the attachment.

The suction unit may have a shape different from the shape in the above embodiment. The suction unit may slope linearly or may be a cylinder with a constant diameter in the axial direction. The suction unit may be separate from the body to be attachable and detachable.

The attachment and the body may have any cross section other than a circular cross section. The holder and the cap may have, for example, an oval cross section, and may include the connection port at a decentered position of the oval cross section. The holder and the cap may be polygonal rather than oval.

However, the attachment may not include the holder at the decentered position, unlike in the present embodiment. The body may thus include the extendable unit and the cap coaxially connected to each other.

The attachment and the body may be connected to each other with a structure other than the bayonet connection. For example, one of the attachment or the body may have tabs or other engaging portions, and the other may have recesses, holes, or other receiving portions. These engaging portions and receiving portions may be engaged with one another in the axial direction to achieve the connection. The attachment may be connected to the body with simple fitting (press-fitting) between their openings.

The cylindrical portion of the attachment may not slope diagonally rearward, unlike in the present embodiment. The cylindrical portion may protrude with its axis aligned with the radial direction of the attachment. The cylindrical portion may be eliminated.

The attachment and the front cylindrical portion of the power tool may be connected to each other with a structure other than the bayonet connection.

The power tool is not limited to the hammer drill as in the above embodiment. The power tool may be a hammer drill including a crank assembly as a rotation-striking assembly, or may be an electric hammer without a rotation assembly.

In other words, the present disclosure is applicable to any power tool to which the dust collection cup according to one or more embodiments of the present disclosure is attachable to the front end portion of the housing.

REFERENCE SIGNS LIST 1 dust collection cup
2 attachment
3 body
4 suction unit
11 cylindrical portion
15 cap
16 extendable unit
20 crest
21 rear half
22 front half
30 hammer drill
31 main housing
32 rear housing
33 front housing
34 motor
35 rotational shaft
43 controller
44 rear cylindrical portion
45 front cylindrical portion
50 rotation-striking assembly
51 countershaft
52 tool holder
60 piston cylinder
63 striker
64 impact bolt
B bit

What is claimed is:

1. A dust collection cup attachable to a front end portion of a power tool, the dust collection cup in an attached state allowing a bit attached to the front end portion to extend through the dust collection cup, the dust collection cup comprising:
    an attachment attachable to the front end portion; and
    a body connectable to the attachment, the body including an extendable unit including at least a portion in an axial direction retaining a predetermined length such that the bit is viewable when the body is not pressed against a workpiece.

2. The dust collection cup according to claim 1, further comprising:
    a suction unit connected to the body and open frontward, wherein at least a portion of the body defines the extendable unit.

3. The dust collection cup according to claim 2, wherein the body is attachable to and detachable from the attachment.

4. The dust collection cup according to claim 2, wherein the body including the extendable unit with a minimum length has a length half or less than half a length of the body including the extendable unit with a maximum length in the axial direction.

5. The dust collection cup according to claim 2, wherein the extendable unit is a bellows including a plurality of crests continuous in the axial direction.

6. The dust collection cup according to claim 2, further comprising:
    a connection port located rearward from the extendable unit, the connection port being connectable to an external dust collection hose.

7. The dust collection cup according to claim 1, further comprising:
a suction unit connected to the body and open frontward, wherein a substantially entire portion of the body defines the extendable unit.

8. The dust collection cup according to claim 7, wherein the body is attachable to and detachable from the attachment.

9. The dust collection cup according to claim 7, wherein the body including the extendable unit with a minimum length has a length half or less than half a length of the body including the extendable unit with a maximum length in the axial direction.

10. The dust collection cup according to claim 1, wherein the body is attachable to and detachable from the attachment.

11. The dust collection cup according to claim 7, wherein the extendable unit is a bellows including a plurality of crests continuous in the axial direction.

12. The dust collection cup according to claim 10, wherein
the body including the extendable unit with a minimum length has a length half or less than half a length of the body including the extendable unit with a maximum length in the axial direction.

13. The dust collection cup according to claim 10, wherein
the extendable unit is a bellows including a plurality of crests continuous in the axial direction.

14. The dust collection cup according to claim 1, wherein
the body including the extendable unit with a minimum length has a length half or less than half a length of the body including the extendable unit with a maximum length in the axial direction.

15. The dust collection cup according to claim 14, wherein
the extendable unit is a bellows including a plurality of crests continuous in the axial direction.

16. The dust collection cup according to claim 1, wherein
the extendable unit is a bellows including a plurality of crests continuous in the axial direction.

17. The dust collection cup according to claim 1, further comprising:
a connection port located rearward from the extendable unit, the connection port being connectable to an external dust collection hose.

18. A power tool, comprising:
a front end portion to which a bit is attachable; and
the dust collection cup according to claim 1, the dust collection cup being attachable to the front end portion.

19. A dust collection cup attachable to a front end portion of a power tool, the dust collection cup in an attached state allowing a bit attached to the front end portion to extend through the dust collection cup, the dust collection cup comprising:
an attachment attachable to the front end portion; and
a body connectable to the attachment, the body including an extendable unit including at least a portion in an axial direction retaining a predetermined length, wherein
the extendable unit is a bellows including a plurality of crests continuous in the axial direction,
each of the plurality of crests includes
a rear half flaring from a rear end toward an apex of the crest, and
a front half with a diameter decreasing from the apex toward a front end of the crest, and
the front half has a dimension different from a dimension of the rear half in a front-rear direction.

20. The dust collection cup according to claim 19, wherein
each of the plurality of crests is retainable in a folded state in response to a compressive force applied in the axial direction, and the folded state is a state in which the front half and the rear half overlap.

* * * * *